Oct. 8, 1963 A. W. HAYDON 3,106,620

CAM ACTUATED SWITCH

Filed April 2, 1959 3 Sheets-Sheet 1

INVENTOR
ARTHUR W. HAYDON
BY
Bonnie, Edmonds, Morton, Barrows & Taylor
ATTORNEYS INVENTOR
ARTHUR W. HAYDON
BY
Pennie, Edmonds, Morton, Barrows & Taylor
ATTORNEYS Oct. 8, 1963

A. W. HAYDON 3,106,620

CAM ACTUATED SWITCH

Filed April 2, 1959

3 Sheets-Sheet 3

INVENTOR
ARTHUR W. HAYDON
BY
Pennie, Edmonds, Morton, Barrows & Taylor
ATTORNEYS 3,106,620
CAM ACTUATED SWITCH Arthur W. Haydon, Milford, Conn., assignor to Consolidated Electronics Industries Corp., Waterbury, Conn., a corporation of Delaware
Filed Apr. 2, 1959, Ser. No. 803,625
3 Claims. (Cl. 200—38)

The present invention relates to control devices, and more particularly to a novel and improved electromechanical device for effecting repetitive control functions, including the repetitive timing of control signals of predetermined duration.

In connection with certain multiple telephone circuitry, for example, it is frequently desirable to provide a repetitive or cyclical signal of predetermined duration. By way of example, it is desirable, in certain multiple circuit telephone systems, to provide a "wink" signal, which is advantageously in the form of a light arranged to be turned off repeatedly, for predetermined, short intervals to apprise a user of the system of the condition of one or more of the circuits thereof. Typically, a "wink" signal is provided by de-energizing a light twice each second, for a period of approximately thirty milliseconds.

Desirably, control equipment for telephone circuitry should be compact, relatively inexpensive, extremely reliable and capable of operation over long periods of time with little or no maintenance. Accordingly, the present invention seeks to provide a repeating interval timer, suitable for use in controlling "wink" circuits, for example, which has the foregoing characteristics, among others.

One of the specific features of the invention resides in the provision of a novel and improved electromechanical switching arrangement, comprising a cam, driven at a predetermined speed, and follower means cooperating with the cam and arranged, in response to movements of the cam, to effect opening and closing of signal circuits in the desired manner. In this respect, the device of the invention incorporates cam and cam follower means of an improved type arranged to provide, in a highly reliable manner, and with substantial accuracy, a repetitive signal of extremely short duration, such as thirty milliseconds.

Another specific feature of the invention resides in the provision of a cam actuated signal timing mechanism of the type described, comprising a cam adapted to be driven at a predetermined, uniform speed, and cam followers cooperating with the cam to open and close circuits in a desired sequence throughout each rotational cycle, in which a minimum of input power or torque is required to operate the cam. In this respect, a novel cam and cam follower switching arrangement is provided in which accurate timing of signals is effected by movement of cam followers over specially formed "drop-off" portions of the cam surface, after which the cam followers are displaced gradually and progressively, and with a substantially constant torque, by the rotating cam.

Another specific feature of the invention resides in the provision, in a control device of the type described, of a novel cam assembly, forming part of the overall combination, which may be manufactured inexpensively, operated with a minimum of friction, and incorporated in an advantageous manner in a combination control device.

For a better understanding of the above and other advantageous features of the invention, reference should be made to the following detailed description and to the accompanying drawing in which.

Figure 1:
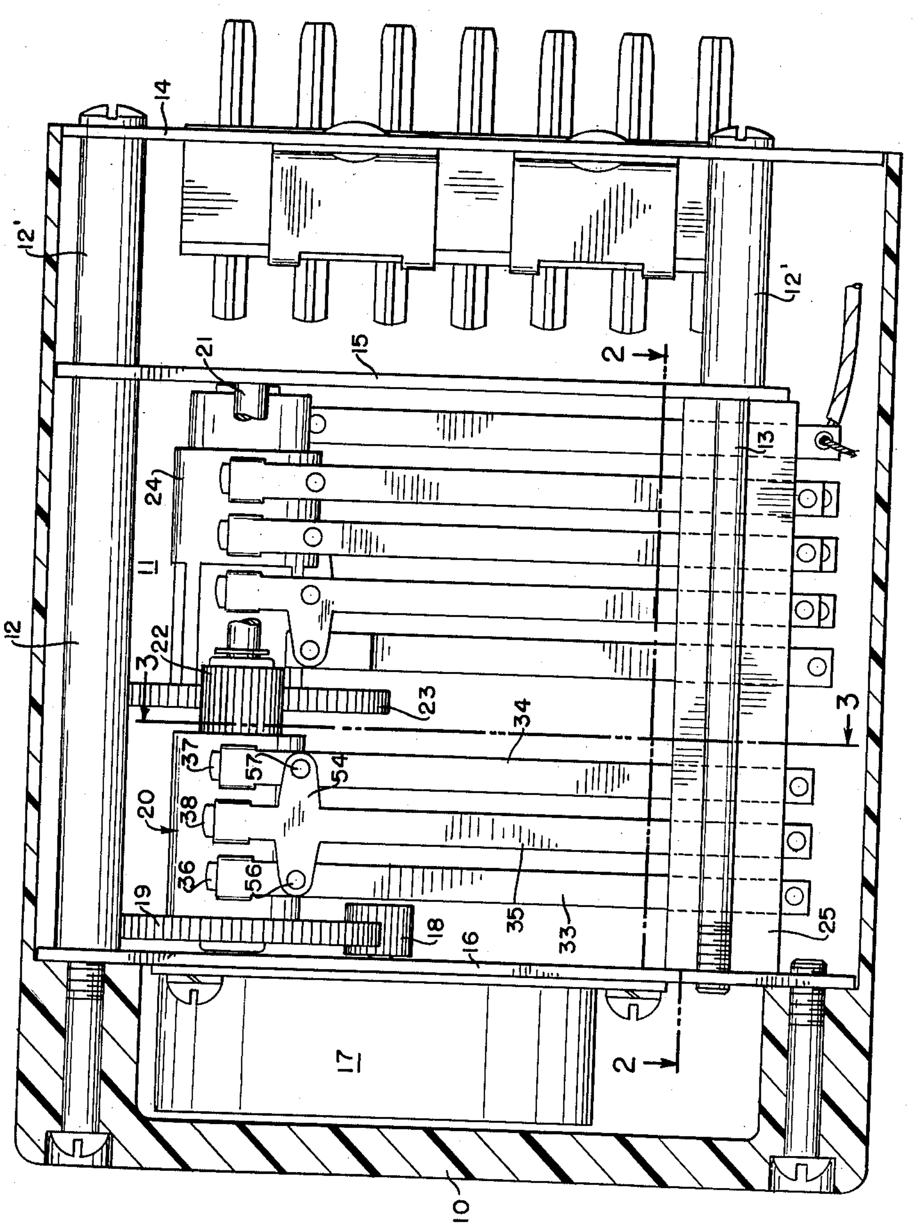
FIG. 1 is a longitudinal, cross-sectional view of a control device, adapted especially for use in connection with telephone circuitry, incorporating the various features of the invention.

Referring now to the drawing, the reference numeral 10 designates generally a housing or casing, in which is received a frame 11, comprising a plurality of longitudinally disposed spacers 12, 12' and rods 13 connecting spaced transversely disposed decks 14–16. The construction of the casing and frame is advantageously, though not necessarily, in accordance with the disclosure of co-pending application Serial No. 723,349, now Patent No. 3,018,151, of R. Nicholson, filed March 24, 1958, for "Housing Structure for Instrument Mechanisms or the Like."

In the illustrated device, a motor 17, which may be a governed or synchronous, constant speed motor, is mounted on the deck 16 and has an output shaft projecting through the deck and mounting a pinion 18. The pinion 18 meshes with a gear 19, forming part of a cam assembly 20, to be described, and the cam assembly 20 is mounted for rotation on a shaft 21 supported at each end by the decks 15, 16. The cam assembly 20 of the illustrated device has, at its opposite end, a pinion 22 which meshes with a gear 23 forming part of a second cam assembly 24. The assembly 24 forms no part of the present invention and therefore will not be described in detail.

A mounting block 25, advantageously formed of a phenolic resin, is engaged by and serves to separate the lower ends of the deck plates 15, 16. The block 25 is provided at each end with lugs or bosses 26–29, which are received in openings of similar shape in the deck plates, whereby the block is locked in place in the assembly. At appropriate positions on the block are vertical openings or slots 30–32, **30*a*–32*a* arranged to receive the lower end portions of arms 33–35, 33*a*–35*a*, formed of resilient, conductive material. The arms, which may be referred to as switch arms, extend upward from the block 25, and pass on opposite sides of the cam assembly 20**, in generally tangent relation. Advantageously, for reasons which will appear, the switch arms are capable of vertical adjustment in the receiving slots, at least as part of production procedure. In the finished device, the arms may be fixed in position by suitable bonding means, if desired.

At their upper ends, the resilient switch arms mount cam followers 36–38, **36*a*–38*a***, respectively, which are advantageously in the form of wheels mounted for free rotation. The specific form of the cam followers and the means of mounting the followers is described and claimed in the co-pending application Serial No. 753,042, now Patent No. 2,953,667, of R. J. Kavanaugh, filed August 4, 1958, for "Cam Follower Means and Mounting," and reference may be had to that patent for further description.

Figure 4:
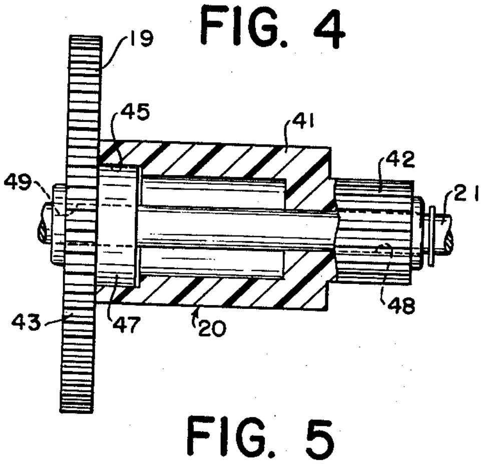
FIG. 4 is an enlarged, fragmentary, cross-sectional view of an improved cam assembly incorporated in the device of FIG. 1.
Figures 5, 6:
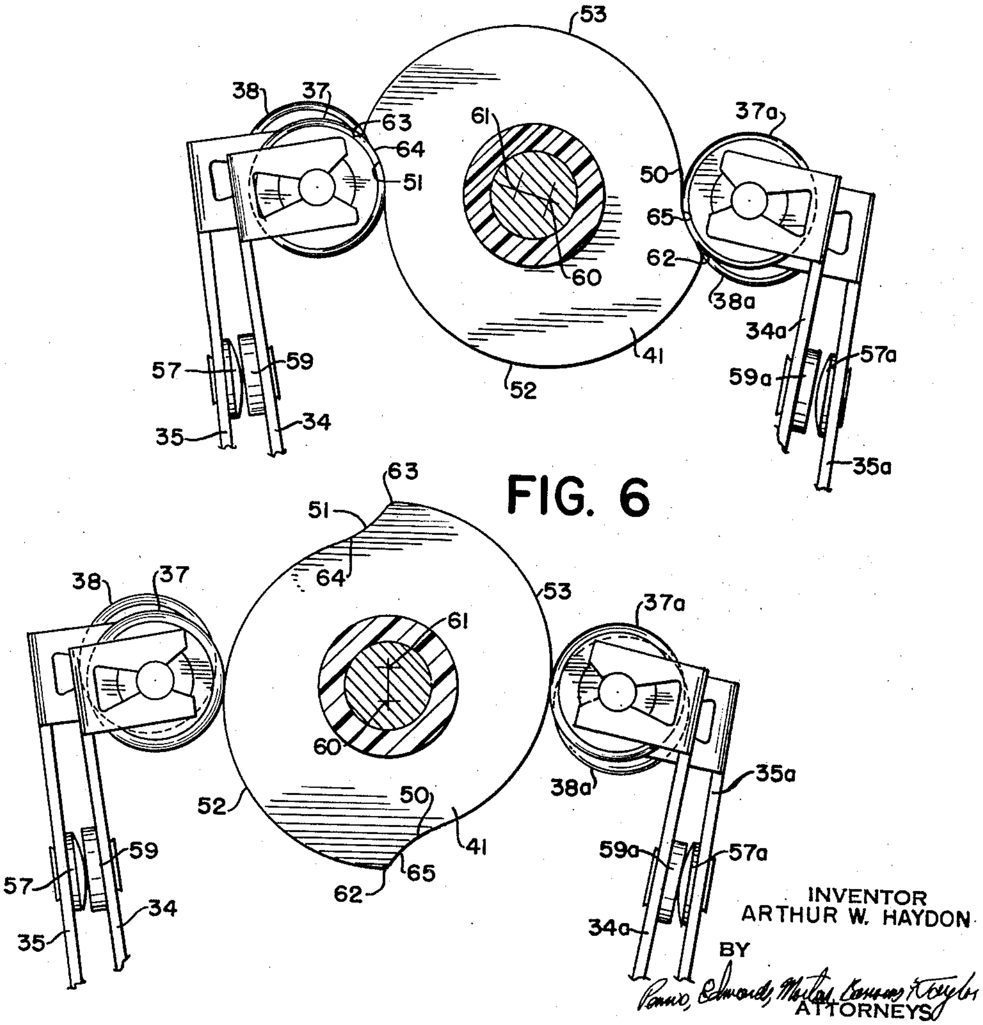
FIGS. 5 and 6 are fragmentary, sequential views illustrating the operation of improved switching means incorporated in the device of FIG. 1.

In accordance with one aspect of the invention, the cam assembly 20, illustrated in detail in FIG. 4, comprises a body section 41, with an integral end section 42 and an attached end section 43. The sections 41–43 of the cam assembly 20 advantageously are molded of a hard, plastic material, such as nylon, and portions of the end sections 42, 43 are molded to form the gear 19 and pinion 22. The body section 41 of the cam is elongated in the direction of its axis and is provided with a contoured outer surface, to be described in more detail. At one end of the cam body 41 is a recess 45, advantageously formed with splines, in which is received a splined boss or hub 47 of the end section 43. The section of the cam assembly may be molded to provide a force fit, or other means, such as a suitable adhesive material, may be employed.

As shown in FIG. 4, the central portion of the cam body 41, is of greater diameter than the shaft 21 so that, when the cam assembly is mounted on the shaft 21, the body portion of the cam is spaced from the shaft. The end sections 42, 43, on the other hand, are provided with central openings 48, 49 respectively, which are received closely on the shaft 21 and form spaced bearing portions for the cam assembly. The arrangement is such that the cam assembly 20 may rotate on the shaft 21 with a minimum of friction. In addition, the assembly is such that, using practicable manufacturing tolerances, excessive looseness of the cam assembly on the shaft 21 is avoided while, at the same time, binding of the cam assembly on the shaft is effectively minimized.

Figures 2, 3:
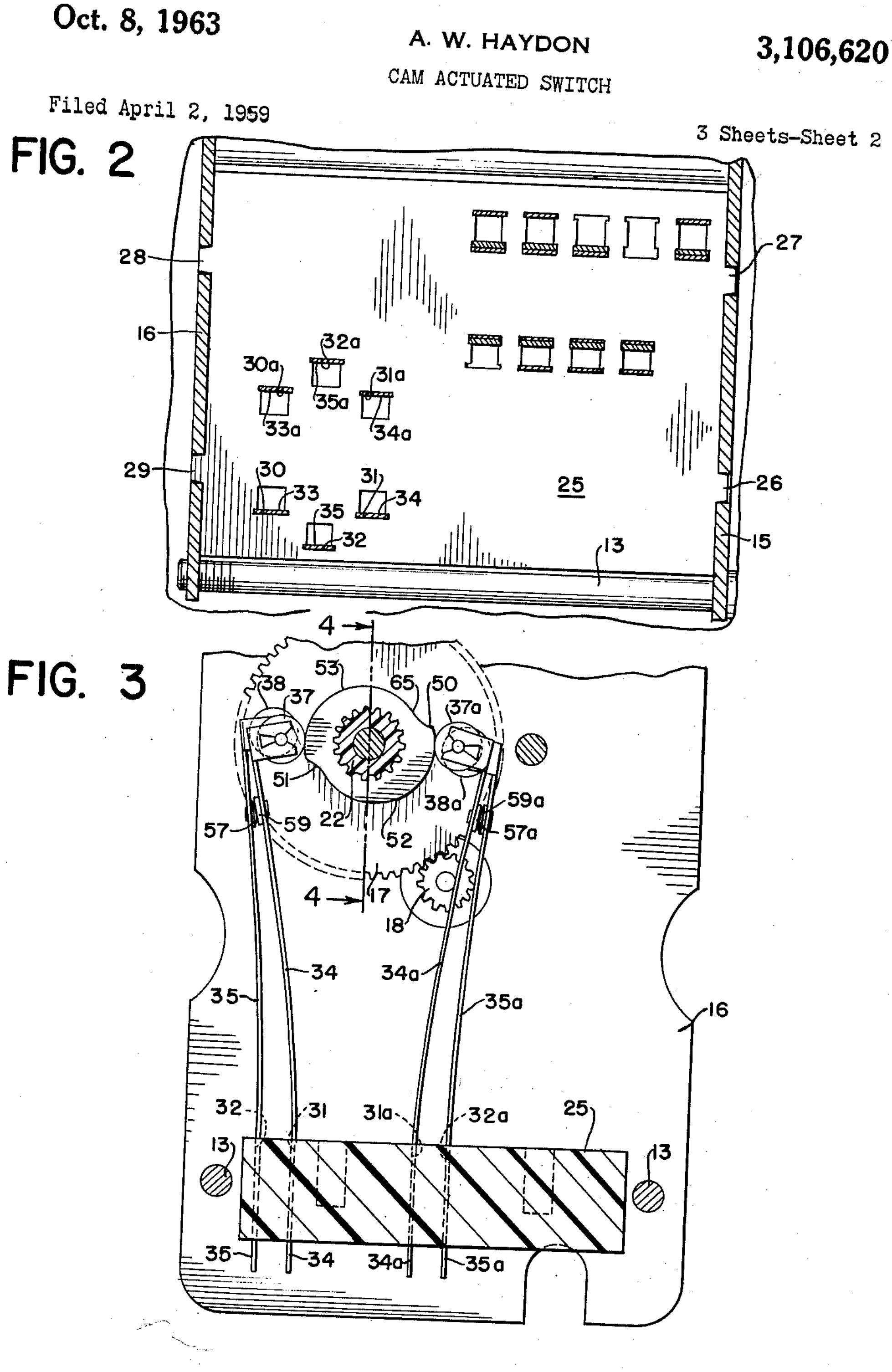
FIG. 2 is a fragmentary, cross-sectional view taken generally along line 2—2 of FIG. 1.
FIG. 3 is a cross-sectional view taken on line 3—3 of FIG. 1.

As one of the features of the invention, the body portion 41 of the cam is contoured to provide a pair of diametrically opposed drop-off sections 50, 51, and between the drop-off portions are portions 52, 53 which rise gradually and progressively, in relation to the rotational axis of the cam, from the low point of one drop-off to the high point of the next drop-off. As shown in FIG. 3, for example, the cam assembly 20 is so positioned, in relation to opposed pairs of resilient switch arms 35—35*a*, 34—34*a*, that the followers of the respective arms engage the surface of the cam body 41 substantially at diametrically opposed points. When the cam is rotated in a clockwise direction, as viewed in FIG. 3, the followers 38—38*a*, 37—37*a* are caused to rise along the cam riser portions 52, 53 (i.e., move radially outward from the cam axis) until the drop-off portions 50, 51 move past the followers, at which time the followers move quickly inward under the resilient urging of the switch arms. The outward displacement of the followers, against the resilient restraining force of the arms, requires a minimum of torque, due to the gradual, progressive rise of the cam portions 52, 53, as will be understood, and friction on the cam bearings is reduced to a minimum by arranging the sets of resilient arms in opposition to each other.

In accordance with one of the important features of the invention, the arms 35, 35*a* are so arranged that the followers 38, 38*a* carried at the upper ends thereof trail the followers 36, 37 and 36*a*, 37*a* in the direction of cam rotation, that is, the cam follower 38 lies slightly above the followers 36, 37, while the follower 38*a* lies slightly below the followers 36*a*, 37*a*. Accordingly, the drop-off portions 50, 51 of the cam will move past the cam followers 38, 38*a* a predetermined time after moving past the followers 36–37*a*. In this respect, in a typical embodiment of the invention, the cam assembly 20 may be rotated at a speed of 60 revolutions per minute, and the followers 38, 38*a* may trail the cam followers 36–37*a* by an amount equal to about nine degrees of cam rotation, whereby a drop-off portion moves by the followers 38, 38*a* approximately twenty-five milliseconds after moving past the followers 36–37*a*. It will be understood, however, the duration of the circuit interruption may be varied by shifting some or all of the switch arms longitudinally in the mounting block. Any such adjustment would be made during production, as a general rule, and the relative positions of the arms are fixed in the assembled device.

In the illustrated form of the invention, the switch arms 35, 35*a* are provided adjacent their upper ends with projecting portions 54, 54*a* on which are carried electrical contacts 56, 57 and 56*a*, 57*a*. The projecting portions 54, 54*a* overlie the arms 33–34*a*, as shown in FIG. 1, and the arms 33–34*a* are provided with outwardly facing contacts 58, 59 and 58*a*, 59*a* which are adapted to engage the contacts 56–57*a* to complete circuits from the arm 35 to arms 33, 34 and from arm 35*a* to arms 33*a*, 34*a*.

Advantageously, the arrangement of the contacts 56–58*a* and the arms 33–35*a* is such that, when the contacts are engaged, the trailing cam followers 38, 38*a* are held outward slightly from the cam by the leading cam followers 36–37*a*, as shown in exaggerated form in FIG. 3. However, as the cam rotates to bring the drop-off portions 50, 51 by the leading cam followers 36–37*a* the arms 33–34*a* move radially inward, allowing the arms 35, 35*a* to move inward a short distance until the trailing followers 38, 38*a* engage the outer surface of the cam. The drop-off portions 50, 51 of the cam are substantially greater in depth than the distance the trailing followers 38, 38*a* are normally held away from the cam surface, so that inward movement of the leading cam followers separates the contacts 56–59*a*. Upon continued rotation of the cam, the drop-off portions 50, 51 pass the trailing cam followers 38, 38*a*, allowing the arms 35, 35*a* to move radially inward to re-establish electrical contact. Thus, the circuits normally established between the several switch arms are broken periodically, as the cam followers move relatively over the drop-off portions 50, 51 in sequence, and the interval during which the circuits are interrupted is determined in part by the spacing, measured generally circumferentially of the cam, between cooperating sets of leading and trailing cam followers.

In the illustrated form of the invention, the circuits formed between the switch arms are normally closed and are interrupted repetitively, for measured intervals of time, as the cam followers move sequentially, relatively, past the drop-off portions of the cam. However, as will be readily understood, the arrangement of the arms and contacts may be such that the circuits are normally opened and are closed for predetermined intervals. Likewise, combination circuits may be provided wherein, as cam followers move sequentially, relatively, past a drop-off portion of the cam, one circuit is opened while another is closed. Further possibilities will, of course, be readily apparent to those skilled in the art.

As one of the more specific features of the invention, the cam 41 is so contoured, in relation to the size of the cam followers, as to provide for a practical minimum of noise and wear in operation and for minimum power consumption. To this end, the riser portions 52, 53 of the cam are advantageously "uniform rise" portions, increasing in radius uniformly for each degree of rotation. However, for ease of layout, mold-making and manufacture, the uniform rise advantageously may be approximated by arcs, whose centers 60, 61 lie on a diameter, spaced slightly from the cam axis, on opposite sides thereof. The riser portions extend over arcs of about 160° and join in tangency with small, convex arcs 62, 63, at their outer ends, and with larger, concave arcs 64, 65 at their inner ends. The small and large arcs 63, 64 and 62, 65, of the opposed cam sections merge in tangency to complete the cam contour.

In one commercial embodiment of the invention, the riser portions have a radius of about 0.256 inch, the small arcs 62, 63 have a radius of about 0.031 inch, and the large, concave arcs 64, 65 have a radius of about 0.156 inch. The cam thus dimensioned is used in conjunction with cam followers of 0.187 inch in diameter. The specific dimensions used, and proportions thereof are known to be particularly advantageous, although it is recognized that departures may be made therefrom to some extent. It will be noted that the radius of the concave arcs 64, 65 is greater than that of the follower wheels, so that the followers "roll down" the arcs, rather than "drop off" or "strike." Noise and wear due to impact are thus reduced.

In the combination control mechanism illustrated in FIG. 1, the cam assembly 20 advantageously forms part of a power train, by which the motor 17 is connected to the gear 23, to drive additional timing cams or other components. The other parts of the mechanism, forming no part of the present invention, will not be described in detail.

One of the important advantages of the invention resides in the provision of a simplified, electromechanical arrangement for obtaining highly accurate, repetitive timing of intervals of short duration. Thus, the illustrated apparatus, in one contemplated commercial application, provides a timed pulse (open circuit) of thirty milliseconds duration twice during each second. With the improved arrangement, the cam assembly 20 may be arranged to rotate at low speed (e.g., 60 r.p.m.), or intermittently, so that power consumption is minimized, while at the same time retaining substantial accuracy of the timing pulse. This is accomplished by utilizing, in conjunction with the cam assembly 20, pairs of followers arranged so that one follower trails the other by a predetermined distance, measured generally circumferentially of the cam. As a drop-off portion of the cam moves sequentially past the followers, a pair of contacts is actuated from one operative condition to another for an interval of accurately predetermined duration.

The improved arrangement is extremely reliable in operation and will operate over long periods of time with little or no maintenance, as is an important characteristic of equipment used for the control of telephone circuitry, for example. The resilient switch arms are mounted or anchored a substantial distance from the cam assembly 20, so that flexing of the arms induces minimum stress, and the moving parts of the device may operate at low speed, in relation to the timing intervals involved, so that wear, fatigue, etc., are reduced to a minimum. The result of using opposed sets of arms is to minimize frictional loading of the bearings, thereby requiring less power to operate the mechanism and less wear. The only radial load on shaft 21 is the difference in spring forces of the two sets of contacts, whereas, if the arms were all on one side, the sum of the spring forces would be applied to shaft 21. Also, energy is stored in the resilient contact arms which actually assists the motor in driving the cam as the followers run over the points 62—63. Thus, there are no "peak load" points in the operation of the contact mechanism (as would be required, for example, if rotation was in the opposite direction).

Power consumption, wear and noise are kept at a minimum by the novel arrangement of cam and cam followers, requiring a low maximum torque and thereby permitting the use of a low power drive motor for high operating efficiency. The construction of the cam is also such that running friction is minimized, while at the same time other advantages are realized, such as economy of manufacture and advantageous incorporation of the cam in a drive train.

It should be understood, however, that the specific features herein illustrated and described are intended to be representative only, as certain changes may be made therein without departing from the clear teachings of the disclosure. Accordingly, reference should be made to the following appended claims in determining the full scope of the invention.

I claim:

1. Silent switching means comprising a cam of generally cylindrical shape, said cam having an axis of rotation, said cam having a constant cross section along its axis of rotation, said cam having a non-circular profile which includes gradually and progressively rising and roll-down portions, means for rotating said cam in a predetermined direction, first and second cooperatively related roller cam followers, said cam followers being supported for cooperation with said cam, said cam having active riser surface portions which include a pair of opposed gradually and progressively rising portions having arc-shaped profiles of relatively large radius, and active roll-down surface portions which interconnect said riser portions, said roll-down portions including concave and convex surface portions, said convex portions having arc-shaped profiles of relatively small radius merging tangently with the outer ends of said riser profiles, said concave portions having arc-shaped profiles of smaller radius than said riser profiles and larger radius than said roller cam follower, said concave arc-shaped profiles merging tangently with the convex arc-shaped profiles and with the inner ends of the riser profiles, said first follower being spaced from said second follower a predetermined distance measured generally circumferentially of said cam whereby said first follower is a leading follower and said second follower is a trailing follower with respect to the predetermined direction of rotation of said cam surface portions past said followers, cam follower supporting means mounting said followers, said supporting means resiliently urging said cam followers toward the cam surface, and switch contact means associated with said cam followers and movable therewith, said contact means cooperating alternately to make and break an electrical circuit when in first and second operative conditions, said contact means normally being held in said first operative condition when said rising cam portion underlies both of said leading and trailing followers, said contact means being arranged to shift to said second operative condition for a predetermined interval when said roll-down portion passes said leading follower, said predetermined interval of said second operative condition being determined by the circumferential spacing of said leading and trailing followers and the angular velocity of said cam.

2. The switching means of claim 1, in which said contact means are normally closed, said leading follower normally engages the cam surface, said trailing follower is normally held spaced from said cam surface by closure of said contact means when said leading follower engages said rising portion, and said trailing cam follower engages said rising cam portion when said leading follower is passing said roll-down portion, whereby said switch contacts are closed during the interval that said leading follower engages said rising portion, said switch contacts are opened during the interval that said leading follower passes said roll-down portion and reclosed when said trailing follower subsequently passes said roll-down portion.

3. The switching means of claim 1 in which the active riser portions extend about the cam profile for approximately 320 degrees and the active roll-down portions extend about the cam profile for approximately 40 degrees.

References Cited in the file of this patent

UNITED STATES PATENTS

| | | |
|---|---|---|
| 1,563,488 | Hoge | Dec. 1, 1925 |
| 2,007,591 | Beattie | July 9, 1935 |
| 2,346,623 | Stewart et al. | Apr. 11, 1944 |
| 2,432,294 | Dimmer | Dec. 9, 1947 |
| 2,690,526 | Morrison | Sept. 28, 1954 |
| 2,733,619 | Smith | Feb. 7, 1956 |
| 2,755,348 | Phelon | July 17, 1956 |
| 2,765,377 | Buchmann | Oct. 2, 1956 |
| 2,829,540 | Niemeyer | Apr. 8, 1958 |
| 2,834,223 | Strnad | May 13, 1958 |
| 2,853,567 | Kock | Sept. 23, 1958 |
| 2,953,667 | Kavanaugh | Sept. 20, 1960 |